(12) United States Patent
Ahmed et al.

(10) Patent No.: US 7,702,627 B2
(45) Date of Patent: *Apr. 20, 2010

(54) EFFICIENT INTERACTION AMONG COST-BASED TRANSFORMATIONS

(75) Inventors: Rafi Ahmed, Fremont, CA (US); Allison Lee, Sunnyvale, CA (US)

(73) Assignee: Oracle International Corporation, Redwood Shores, CA (US)

(*) Notice: Subject to any disclaimer, the term of this patent is extended or adjusted under 35 U.S.C. 154(b) by 200 days.

This patent is subject to a terminal disclaimer.

(21) Appl. No.: 11/716,126

(22) Filed: Mar. 8, 2007

(65) Prior Publication Data

US 2007/0179947 A1 Aug. 2, 2007

Related U.S. Application Data

(63) Continuation-in-part of application No. 10/874,400, filed on Jun. 22, 2004.

(60) Provisional application No. 60/782,785, filed on Mar. 15, 2006.

(51) Int. Cl.
G06F 17/30 (2006.01)
(52) U.S. Cl. .............................. 707/5; 707/4
(58) Field of Classification Search .............. 707/4, 707/5
See application file for complete search history.

(56) References Cited

U.S. PATENT DOCUMENTS

| | | | |
|---|---|---|---|
| 4,769,772 A | 9/1988 | Dwyer | |
| 4,829,427 A | 5/1989 | Green | |
| 5,091,852 A | 2/1992 | Tsuchida et al. | |
| 5,325,525 A | 6/1994 | Shan et al. | |
| 5,339,429 A | 8/1994 | Tanaka et al. | |
| 5,412,804 A | 5/1995 | Krishna | |
| 5,437,032 A | 7/1995 | Wolf et al. | |
| 5,452,468 A | 9/1995 | Peterson | |
| 5,495,419 A | 2/1996 | Rostoker et al. | |
| 5,495,605 A | 2/1996 | Cadot | |
| 5,495,606 A | 2/1996 | Borden et al. | |
| 5,537,588 A | 7/1996 | Engelmann et al. | |
| 5,548,755 A | 8/1996 | Leung et al. | |
| 5,551,027 A | 8/1996 | Choy et al. | |
| 5,574,900 A | 11/1996 | Huang et al. | |
| 5,588,150 A * | 12/1996 | Lin et al. | 707/1 |
| 5,590,319 A | 12/1996 | Cohen et al. | |
| 5,590,324 A | 12/1996 | Leung et al. | |
| 5,642,515 A | 6/1997 | Jones et al. | |
| 5,675,791 A | 10/1997 | Bhide et al. | |
| 5,680,547 A | 10/1997 | Chang | |

(Continued)

OTHER PUBLICATIONS

Oracle, "Oracle 9I Database Documentation", Oracle, Parts A96670-01, A96674-01, A96673-02, 2002, 833 pages.

(Continued)

*Primary Examiner*—Tim T. Vo
*Assistant Examiner*—Shiow-Jy Fan
(74) *Attorney, Agent, or Firm*—Hickman Palermo Truong & Becker LLP; Eric L. Sutton

(57) ABSTRACT

During query optimization, when a particular type of transformation is considered, the effect of performing one or more subsequent kinds of transformations is also considered in conjunction with the first. When applying a transformation, which forecloses applying another, both are considered independently.

38 Claims, 2 Drawing Sheets

U.S. PATENT DOCUMENTS

| | | | |
|---|---|---|---|
| 5,710,915 A | 1/1998 | McElhiney | |
| 5,724,570 A * | 3/1998 | Zeller et al. | 707/3 |
| 5,787,251 A | 7/1998 | Hamilton et al. | |
| 5,797,136 A | 8/1998 | Boyer et al. | |
| 5,822,748 A | 10/1998 | Cohen et al. | |
| 5,832,477 A | 11/1998 | Bhargava et al. | |
| 5,857,180 A | 1/1999 | Hallmark et al. | |
| 5,905,981 A | 5/1999 | Lawler | |
| 5,918,225 A | 6/1999 | White et al. | |
| 5,924,088 A | 7/1999 | Jakobsson et al. | |
| 5,963,932 A | 10/1999 | Jakobsson et al. | |
| 5,974,408 A | 10/1999 | Cohen et al. | |
| 6,009,265 A | 12/1999 | Huang et al. | |
| 6,026,394 A | 2/2000 | Tsuchida et al. | |
| 6,032,143 A * | 2/2000 | Leung et al. | 707/2 |
| 6,044,378 A | 3/2000 | Gladney | |
| 6,061,676 A | 5/2000 | Srivastava et al. | |
| 6,289,334 B1 | 9/2001 | Reiner et al. | |
| 6,298,342 B1 | 10/2001 | Graefe et al. | |
| 6,339,768 B1 | 1/2002 | Leung et al. | |
| 6,370,524 B1 | 4/2002 | Witkowski | |
| 6,430,550 B1 | 8/2002 | Leo et al. | |
| 6,438,558 B1 | 8/2002 | Stegelmann | |
| 6,438,562 B1 | 8/2002 | Gupta et al. | |
| 6,510,422 B1 | 1/2003 | Galindo-Legaria et al. | |
| 6,529,896 B1 | 3/2003 | Leung et al. | |
| 6,529,901 B1 | 3/2003 | Chaudhuri et al. | |
| 6,535,874 B2 | 3/2003 | Purcell | |
| 6,622,138 B1 | 9/2003 | Bellamkonda et al. | |
| 6,684,203 B1 | 1/2004 | Waddington et al. | |
| 6,694,306 B1 | 2/2004 | Nishizawa et al. | |
| 6,792,420 B2 | 9/2004 | Chen et al. | |
| 6,801,905 B2 | 10/2004 | Andrei | |
| 6,901,405 B1 | 5/2005 | McCrady et al. | |
| 6,934,699 B1 | 8/2005 | Haas et al. | |
| 6,941,360 B1 | 9/2005 | Srivastava et al. | |
| 6,954,776 B1 | 10/2005 | Cruanes et al. | |
| 6,961,729 B1 | 11/2005 | Toohey et al. | |
| 6,980,988 B1 | 12/2005 | Demers et al. | |
| 6,990,503 B1 | 1/2006 | Luo et al. | |
| 7,031,956 B1 | 4/2006 | Lee et al. | |
| 7,072,896 B2 | 7/2006 | Lee et al. | |
| 7,089,225 B2 | 8/2006 | Li et al. | |
| 7,146,360 B2 | 12/2006 | Allen et al. | |
| 7,167,852 B1 | 1/2007 | Ahmed et al. | |
| 7,246,108 B2 | 7/2007 | Ahmed | |
| 7,440,935 B2 | 10/2008 | Day et al. | |
| 2001/0047372 A1 | 11/2001 | Gorelik et al. | |
| 2002/0038313 A1 | 3/2002 | Klein et al. | |
| 2002/0138376 A1 | 9/2002 | Hinkle | |
| 2003/0120825 A1 | 6/2003 | Avvari et al. | |
| 2003/0120879 A1 | 6/2003 | Chen et al. | |
| 2003/0167258 A1 | 9/2003 | Koo et al. | |
| 2004/0068509 A1 | 4/2004 | Garden et al. | |
| 2004/0068696 A1 | 4/2004 | Seyrat et al. | |
| 2004/0143791 A1 | 7/2004 | Ito et al. | |
| 2004/0148278 A1 | 7/2004 | Milo et al. | |
| 2004/0167904 A1 | 8/2004 | Wen et al. | |
| 2004/0220911 A1 | 11/2004 | Zuzarte et al. | |
| 2004/0220923 A1 | 11/2004 | Nica | |
| 2004/0267760 A1 | 12/2004 | Brundage et al. | |
| 2004/0268305 A1 | 12/2004 | Hogg et al. | |
| 2005/0033730 A1 | 2/2005 | Chaudhuri et al. | |
| 2005/0055382 A1 | 3/2005 | Ferrat et al. | |
| 2005/0076018 A1 | 4/2005 | Neidecker-Lutz | |
| 2005/0149584 A1 | 7/2005 | Bourbonnais et al. | |
| 2005/0187917 A1 | 8/2005 | Lawande et al. | |
| 2005/0198013 A1 | 9/2005 | Cunningham et al. | |
| 2005/0210010 A1 | 9/2005 | Larson et al. | |
| 2005/0234965 A1 | 10/2005 | Rozenshtein et al. | |
| 2005/0278289 A1 | 12/2005 | Gauweiler et al. | |
| 2005/0278616 A1 | 12/2005 | Eller | |
| 2005/0283471 A1 | 12/2005 | Ahmed | |
| 2005/0289125 A1 | 12/2005 | Liu et al. | |
| 2006/0026115 A1 | 2/2006 | Ahmed | |
| 2006/0026133 A1 | 2/2006 | Ahmed | |
| 2006/0041537 A1 | 2/2006 | Ahmed | |
| 2006/0167865 A1 | 7/2006 | Andrei | |
| 2006/0168513 A1 | 7/2006 | Coulson et al. | |
| 2007/0027880 A1 | 2/2007 | Dettinger et al. | |
| 2007/0044012 A1 | 2/2007 | Suver et al. | |
| 2007/0073643 A1 | 3/2007 | Ghosh et al. | |
| 2007/0179947 A1 | 8/2007 | Ahmed et al. | |
| 2007/0219951 A1 | 9/2007 | Ahmed et al. | |
| 2007/0219952 A1 | 9/2007 | Ahmed et al. | |
| 2007/0219969 A1 | 9/2007 | Su et al. | |
| 2007/0219977 A1 | 9/2007 | Su et al. | |
| 2008/0010240 A1 | 1/2008 | Zait | |
| 2008/0077606 A1 | 3/2008 | Fang et al. | |

OTHER PUBLICATIONS

Fitzgerald et al., "Special Edition Using Crystal Reports IO", Que, Chapters 23, 24, 27, 35, Appendix A, Jul. 14, 2004, 170 pages.

Rankins et al., "Microsoft SQL Server 2000 Unleashed," Second Edition, Sams, Chapters 3, 4, 5, 6, 36, Dec. 18, 2002, 109 pages.

Chen, et al., "View merging in the context of view selection changing", Database Engineering and Applications Symposium 2002, Proceedings, Jul. 2002, 10 pages.

Bergsten, et al., "Prototyping DBS3 a Shared-Memory Parallel Database System", IEEE 818622954, 226-234, 1991, pp. 226-234.

Bhide, Anupam, "An Analysis of Three Transaction Processing Architectures", Computer Science Division, UC Berkeley, Proceeding of the 14$^{th}$ VLDB Conference, 1998, pp. 339-350.

Copeland, George et al., "Data Placement in Bubba," ACM 0897912683, 1988, pp. 99-108.

Dayal, Umeshwar, "Of Nests and Trees: A Unified Approach to Processing Queries That Contain Nested Subqueries, Aggregates and Quantifiers", Proceedings of the 13$^{th}$ VLDB Conference, Brighton 1987, pp. 197-208.

Dewitt, et al., "A Performance Analysis of the Gamma Database Machine," Computer Sciences Department, University of Wisconsin, 1988, pp. 350-360.

Englert, Susan et al., "A Benchmark of NonStop SQL Release 2 Demonstrating Near-Linear Speedup and Scaleup on Large Databases", Technical Report 89.4, Tandem Part No. 27469, May 1989, pp. 1-23.

Graefe, Goetz, "Encapsulation of Parallelism in the Volcano Query Processing System," Mar. 1990, pp. 102-111.

Hirano, et al., "Load Balancing Algorithm for Parallel Processing on Shared Memory Multiprocessor", IEEE, pp. 210-217, 1991.

Hong, et al., "Optimization of Parallel Query Execution Plans in XPRS", Proceedings of the First International Conference on Parallel and Distributed Information Systems, IEEE, 1991, pp. 218-225.

Leverenz et al., "Oracle 8i Concepts Release 8.1.5- A67781-01", Oracle Corporation, Feb. 1999, located on the internet at <http://www.csee.umbc.edu/help/oracle8/server.815/a67781/toc.htm>, 122 pages.

Lumpkin, George et al., "Query Optimization in Oracle 9i", Oracle Corporation, Oracle White Paper, Feb. 2002, pp. 1-30.

Pirahesh, Hamid, et al., "Extensible/Rule Base Query Rewrite Optimization in Starburst", IBM Almaden Research Center.

Selinger, P. Griffiths, et al., "Access Path Selection in a Relational Database Management System", Proceedings of the 1979 ACM SIGMOD International Conference on the Management of Data, 1979, pp. 23-34.

Stonebraker, Michael, et al. "The Design of XPRS," Proceedings of the 14$^{th}$ VLDB Conference, 1988, pp. 318-330.

Tandem, "A Benchmark of NonStop SQL on the Debit Credit Transaction", The Tandem Performance Group, 1988, pp. 337-341.

Deutsch, Alin et al., "Minimization and Group-By Detection for Nested XQueries", University of California, San Diego, 2003, 15 pages.

Dehaan, David, "A Rewriting Algorithm for Multi-Block Aggregation Queries and Views using Prerequisites and Compensations", University of Waterloo, Canada, Technical Report CS-2004-25, May 3, 2004, 39 pages.

Chaudhuri, Surajit, "An Overview of Query Optimization in Relational Systems", Microsoft Research, 1998, 10 pages.

Muralikrishna, M., "Improved Unnesting Algorithms for Join Aggregate SQL Queries", VLDB Conference, Canada, 1992, 12 pages.

Hayu, John, "Analytic SQL Features in Oracle9i", An Oracle Technical White Paper, Dec. 2001, 32 pages.

Oracle, "Optimizer Modes, Plans Stability, and Hints", Oracle8i Tuning Release 8.1.5 A67775-01, Oracle Website, 1999, 54 pages.

George Lumpkin, Hakan Jakobsson, "Query Optimization in Oracle 9i", Oracle Corporation, Oracle White Paper, Feb. 2002, pp. 1-30.

Hamid Pirahesh, Joseph M. Hellerstein, Waqar Hasan, "Extensible/Rule Base Query Rewrite Optimization in Starburst", IBM Almaden Research Center, pp. 1-10.

Umeshwar Dayal, "Of Nests and Trees: A Unified Approach to Processing Queries That Contain Nested Subqueries, Aggregates and Quantifiers", Proceedings of the $13^{th}$ VLDB Conference, Brighton 1987, pp. 197-208.

P. Griffiths Selinger, M.M. Astrahan, D.D. Chamberlin, R.A. Lorie, T.G. Price, "Access Path Selection in a Relational Database Management System", Proceedings of the 1979 ACM SIGMOD International Conference on the Management of Data, 1979, pp. 23-34.

Gail Erickson, author. Microsoft TechNet. Improving Performance with SQL Server 2000 Indexed Views. Microsoft Corp. Sep. 2000.

Cesar Galindo-Legaria & Arnon Rosenthal. Outerjoin Simplification and Reordering for Query Optimization. ACM 1997.

Praveen Seshadri et al. Cost-Based Optimization for Magic: Algebra and Implementation. SIGMOD Jun. 1996 ACM 1996.

M. Muralikrishna. Improved Unnesting Algorithms for Join Aggregate SQL Queries. 18th VLDB Conference. Canada, 1992.

Rafi Ahmed et al., "Cost-Based Query Transformation in Oracle," Copyright 2006 VLDB, ACM 1595933859, pp. 1026-1036.

Alin Deutsch et al. Minimization and Group-by Detection for Nested Xqueries. University of California, San Diego. Pub. 2003.

David Dehaan. A Rewriting Algorithm for Multi-Block Aggregation Queries and Views Using Prerequisites and Compensations. University of Waterloo, Canada. Technical Report CS-2004-253 May 3, 2004.

Surajit Chaudhuri. An Overview of Query Optimization in Relational Systems. Microsoft Research. Pub. 1998.

Surajit Chaudhuri et al. Including Group-by in Query Optimization. Hewlett-Packard Laboratories. $20^{th}$ VLDB Conference. Chile, 1994.

Priti Mishra et al. Join Processing in Relational Databases. ACM Computing Surveys. Mar. 1992.

Author: John Hayu. Analytic SQL Features in Oracle9i. An Oracle Technical White Paper. Dec. 2001.

Oracle 8i Tuning Release 8.1.5 A67775-01. Optimizer Modes, Plans Stablility, and Hints. Oracle Website. Copyright 1999.

Li, C. et al., "Minimizing View Sets without Losing Query-Answering Power" 2001, Springer, pp. 99-113.

Mumick, I. et al., "Maintenance of Data Cubes and Summary Tables in a Warehouse", ACM 1997, pp. 100-111.

Rafi Ahmed, "Affidavit of Rafi Ahmed", dated Feb. 8, 2010, 3 pages.

Response to Office Action, U.S. Appl. No. 11/237,040, submitted Feb. 10, 2010, 20 pages.

* cited by examiner

EFFICIENT INTERACTION AMONG COST-BASED TRANSFORMATIONS

RELATED APPLICATIONS

The present application is continuation-in-part of and claims priority to U.S. patent application Ser. No. 10/874,400, *Multi-Tier Query Processing*, filed by Rafi Ahmed on Jun. 22, 2004, the entire contents of which are incorporated herein by reference.

The present application claims priority to U.S. Provisional Application No. 60/782,785 entitled *Cost Based Query Transformation—Join Factorization And Group By Placement*, filed on Mar. 15, 2006 by Hong Su, et al., the entire content of which is hereby incorporated by reference for all purposes as if fully set forth herein.

The present application is related to U.S. patent application Ser. No. 11/716,190, entitled *Join Predicate Push-Down Optimizations*, filed by Rafi Ahmed, Allison Lee and Dinesh Das, on the equal day herewith, the entire content of which is incorporated herein by reference.

FIELD OF THE INVENTION

The present invention relates to database systems, and in particular, to optimization of queries executed by a database system.

BACKGROUND

Relational and object-relational database management systems store information in tables of rows in a database. To retrieve data, queries that request data are submitted to a database server, which computes the queries and returns the data requested.

Query statements submitted to the database server should conform to the syntactical rules of a particular query language. One popular query language, known as the Structured Query Language (SQL), provides users a variety of ways to specify information to be retrieved.

A query submitted to a database server is evaluated by a query optimizer. Based on the evaluation, the query optimizer generates an execution plan that defines operations for executing the query. Typically, the query optimizer generates an execution plan optimized for efficient execution.

When a query optimizer evaluates a query, it determines various "candidate execution plans" and selects an optimal execution plan. The query may be transformed into one or more semantically equivalent queries. For the query and the one or more of transformed queries, various candidate execution plans are generated.

In general, a query optimizer generates optimized execution plans when the query optimizer is able to perform more kinds and combinations of transformations under more kinds of conditions. Based on the foregoing, there is clearly a need for more ways of transforming queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

During query optimization, different kinds of query transformations are considered and may be evaluated one by one in a sequential manner. If a particular type of transformation increases the execution cost of a query, a decision is made not to perform that type of transformation, even though if that type of transformation is considered together with one or more other kinds of transformations, the execution cost of the query is lower.

According to an embodiment of the present invention, when a particular type of transformation is considered, the effect of performing one or more subsequent kinds of transformations is also considered. In another embodiment of the present invention, when applying one transformation forecloses applying another, both are considered and compared. More information on such transformations may be found in *Multi-Tier Query Processing* and in *Cost-based Query Transformation in Oracle*, by Rafi Ahmed, Allison Lee, Andrew Witkowski, Dinesh Das, Hong Su, Mohammed Zait, Thierry Cruanes (presented at VLDB 06, Seoul Korea, Sep. 12-15, 2006)

The term kind or type of transformation, as used herein, refers transformations that are rewritten in a particular way or using specific types of rewrite operations. For example, subquery unnesting, is a type of transformation in which a subquery within an "outer query" is removed and either merged into the outer query or converted to an inline view in the FROM clause of the outer query. Illustrations of subquery unnesting and other types of transformations are provided below.

Illustrative Operational Environment

Figure 1:
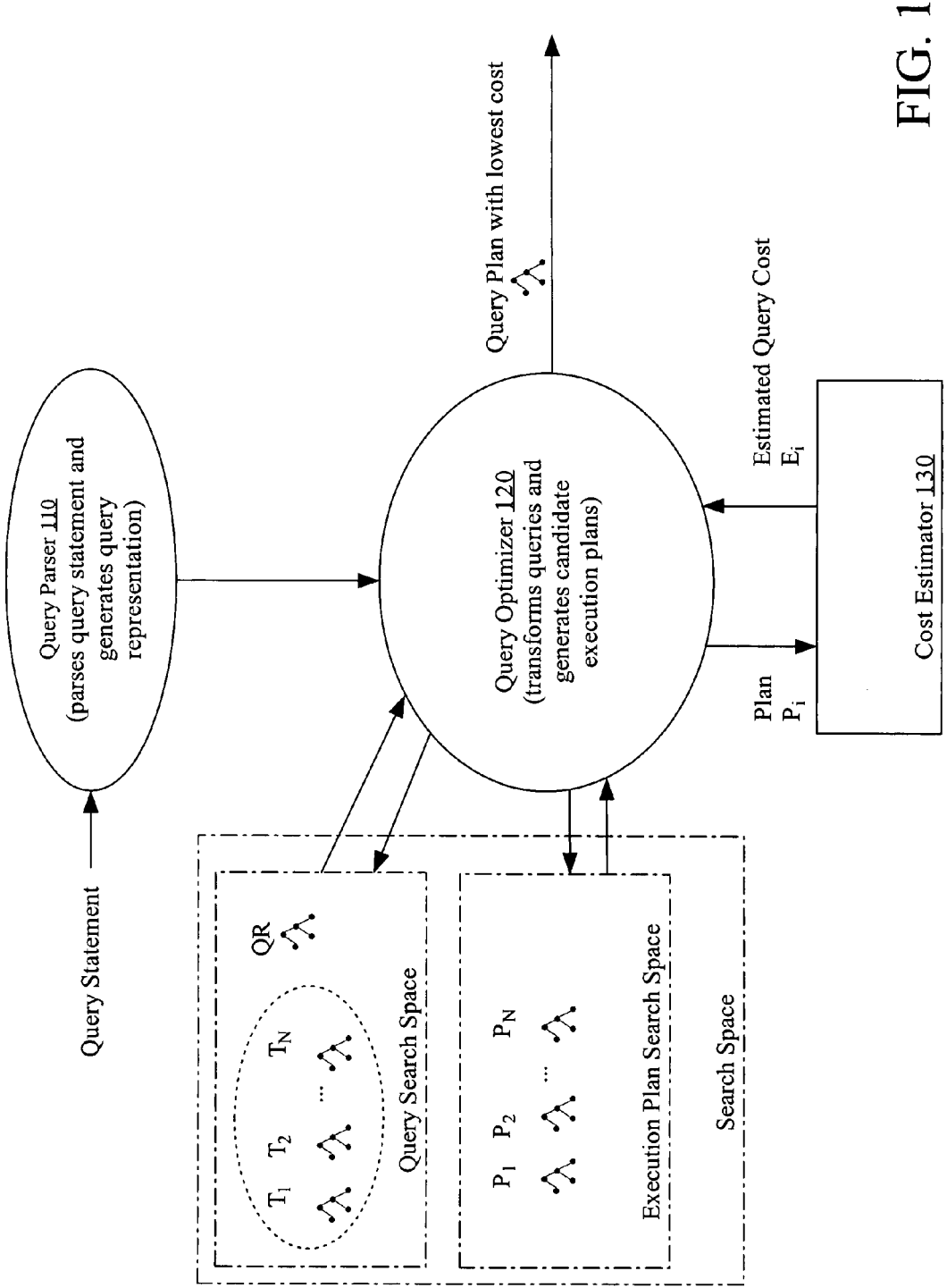
FIG. 1 is a diagram of a query optimizer according to an embodiment of the present invention.
Figure 2:
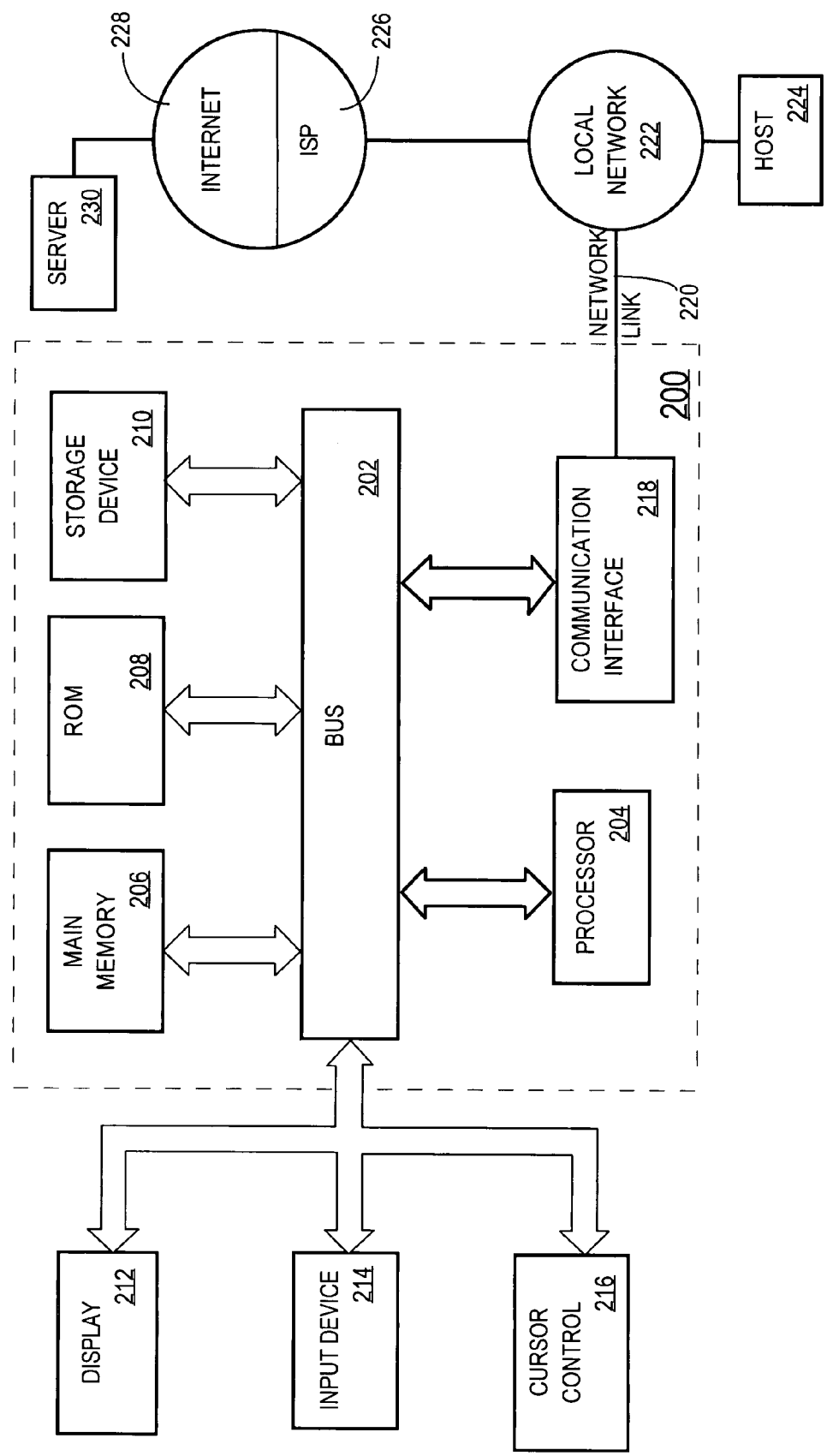
FIG. 2 is a diagram of computer system that may be used in an implementation of an embodiment of the present invention.

FIG. 1 is a diagram depicting a query optimizer and related components within a database server (not shown). Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting database language supported by many database servers is SQL, including proprietary forms of SQL supported by such database servers as Oracle, (e.g. Oracle Database 10 g). SQL data definition language ("DDL") instructions are issued to a database server to create or configure database objects, such as tables, views, or complex types.

Generally, data is stored in a database in one or more data containers, each container contains records, and the data within each record is organized into one or more fields. In relational database systems, the data containers are typically referred to as tables, the records are referred to as rows, and the fields are referred to as columns. In object oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Query Optimizer and Execution Plans

Referring to FIG. 1, query parser 110 receives a query statement QS and generates an internal query representation QR of the query statement. Typically, the internal query representation is a set of interlinked data structures that represent various components and structures of a query statement. The internal query representation may be in the form of a graph of nodes, each interlinked data structure corresponding to a node and to a component of the represented query statement. The internal representation is typically generated in memory for evaluation, manipulation, and transformation by query optimizer 120.

The term query is used herein to refer to any form of representing a query, including a query in the form of a database statement or in the form of an internal query representation. Query optimizer 120 may receive a query from another entity other than query parser 110, where the query received is in the form of an internal query representation.

Query optimizer 120 generates one or more different candidate execution plans for a query, which are evaluated by query optimizer 120 to determine which should be used to compute the query. For query QS, query optimizer 120 generates candidate execution plans $P_1$, $P_2$ through $P_N$.

Execution plans may be represented by a graph of interlinked nodes, referred to herein as operators, that each corresponds to a step of an execution plan, referred to herein as an execution plan operation. The hierarchy of the graphs (i.e., directed tree) represents the order in which the execution plan operations are performed and how data flows between each of the execution plan operations. Execution plan operations include, for example, a table scan, an index scan, hash-join, sort-merge join, nested-loop join, and filter.

Query optimizer 120 may optimize a query by transforming the query. In general, transforming a query involves rewriting a query into another query that produces the same result and that can potentially be executed more efficiently, i.e. one for which a potentially more efficient and less costly execution plan can be generated. Examples of query transformation include view merging, subquery unnesting, filter predicate move-around and pushdown, common subexpression elimination, outer-to-inner join conversion, materialized view rewrite, star transformation, and, join predicate push down. A query is rewritten by manipulating a deep copy of the query representation to form a transformed query representation representing a transformed query. The query as transformed is referred to herein as the transformed query; the query whose copy is transformed is referred to as the base query.

Query optimizer 120 may perform more than one transformation for evaluation. Each transformed query generated for a query is referred to as a candidate transformed query or candidate query. For query QS, query optimizer 120 generates candidate transformed queries $T_1$, $T_2$ ... $T_N$. A transformed query rewritten to generate another transformed query is referred to herein as a base query for the other transformed query. The query originally received by query optimizer 120 is referred to as the original query.

The original query an optimizer optimizes (e.g. query QS) and the alternate transformed queries generated for the query are referred to individually as a candidate query and collectively as the query search space The one or more candidate execution plans generated for each query in the query search space are collectively referred to as the plan search space. The query search space generated by query optimizer 120 for query statement QS includes transformations $T_1$, $T_2$ ... $T_N$ and query QS; the plan search space comprises $P_1$, $P_2$ ... $P_N$.

Cost Estimation

To evaluate the candidate execution plans in the search space, query optimizer 120 estimates a cost of each candidate execution plan and compares the estimated query costs to select an execution plan for execution. In an embodiment, the estimated query cost is generated by a query cost estimator 130, which may be a component of query optimizer 120. For a plan $P_i$ supplied by query optimizer 120, cost estimator 130 computes and generates an estimated query cost $E_i$. In general, the estimated query cost represents an estimate of computer resources expended to execute an execution plan. The estimated cost may be represented as the execution time required to execute an execution plan. To determine which candidate execution plan in the search space to execute, query optimizer 120 may select the candidate execution plan with the lowest estimated cost.

Generating Search Spaces

When determining how to optimize a query, many transformations and/or combinations of transforms can be considered. Determining and generating a transformation and estimating its query execution cost consumes computer resources; doing these for all or even a proportion of all the plans for an original query may create a cost that is significant compared to the cost of executing the original query, if not more. Thus, to optimize the cost of query optimization, various approaches may be used to determine what transformations are considered and when.

One such strategy is the sequential approach, in which types of transformations are considered and decided upon in sequence. Specifically, types of transformations are considered in sequence iteratively and, if applicable, are applied to a current state of the optimized query, referred to herein as the current query state or $Q_{CS}$. Initially, $Q_{CS}$ is the original query.

In an iteration for a particular type of transformation, a determination is made of whether that type of transformation is applicable to $Q_{CS}$, i.e. whether $Q_{CS}$ is capable of being transformed in that way. If so, then that type of transformation is applied to $Q_{CS}$ to generate a candidate query. The cost of the candidate query is generated and compared to the cost of $Q_{CS}$. If the cost of the candidate query is less, then the candidate query becomes $Q_{CS}$; in effect, $Q_{CS}$ is rewritten and transformed into the candidate query. In this case, the type of transformation is referred to herein as being selected for optimization or as being incorporated in the final optimized query. The subsequent type of transformation that is considered is considered based on the new version of $Q_{CS}$.

On the other hand, if the query cost of the candidate query generated in an iteration is greater than that of $Q_{CS}$, the transformation is rejected and $Q_{CS}$ is not changed, i.e. the transformation is not incorporated into $Q_{CS}$. Subsequent types of transformations that are considered are considered based on the unchanged version of $Q_{CS}$.

There are cases that when a given transformation is applied and the cost of the resulting candidate query is greater than $Q_{CS}$, a subsequent transformation can be applied to the candidate query to produce another candidate query with a query execution cost lower than that of $Q_{CS}$. For example, $T_1$ may be applied to $Q_{CS}$ to generate a candidate query $Q_1$. The query cost of $Q_1$ is higher than $Q_{CS}$. However, applying $T_2$ to $Q_1$ yields a candidate query $Q_2$ with a query execution cost lower than that of $Q_{CS}$. Thus, the effect of applying $T_1$ in combination with subsequently applying $T_2$ is to lower execution cost. Under sequential processing, such a combination is never considered because $T_1$ is rejected since by itself it increases query execution cost over $Q_{CS}$.

Interleaving

According to an embodiment, when making a decision about whether to select a given type of transformation for optimization, the effect of applying another type of transformation (or more) in combination with the given type of transformation is considered. This way of evaluating a given type of transformation is referred to herein as interleaving. Preferably, interleaving is under taken for a type of transformation that interacts with other types of transformations to, for example, lower query execution cost. In some cases, interleaving is performed when a certain type of transformation creates the possibility of another type of transformation, i.e. results in a query in which the other type of transformation is made applicable whereas before transformation was not. When it is determined that a certain type of transformation has been performed that may be interleaved with other types of transformations, interleaving is performed to make a cost-based decision about whether to select the certain type of transformation.

Subquery Unnesting/Join Predicate Push Down

A combination of transformations that can be interleaved is a subquery unnesting and a join-predicate-push down. Subquery unnesting is defined earlier in the specification. A join predicate push down is a type of transformation in which a join predicate from an outer query that references a column of a view of an outer query is "pushed down" into the view.

The following query QA is used to illustrate an anti-joined view that is generated using subquery unnesting and then subsequently transformed using join predicate push down.

QA=SELECT T1.c, T2.x
    FROM T1, T2
    WHERE T1.c=T2.d and NOT EXISTS
        (SELECT 1
         FROM T4, T3
         WHERE T3.p=T4.q and T2.y=T3.y);

Subquery unnesting produces the following query QA' with anti-joined view V. Note that the anti-join operator A= is non-standard SQL and is used here for the purpose of illustration only.

QA'=SELECT T1.c, T2.x
    FROM T1, T2, (SELECT T3.y
        FROM T4, T3
        WHERE T3.p=T4.q) V
    WHERE T1.c=T2.d and T2.y A=V.y;

Join predicate push down transformation of QA' produces the following query QA'', in which the view V has undergone join predicate push down.

QA''=SELECT T1.c, T2.x
    FROM T1, T2, (SELECT T3.y
        FROM T4, T3
        WHERE T3.p=T4.q and T2.y=T3.y) V
    WHERE T1.c=T2.d;

To determine whether to use subquery unnesting and join predicate push down, the cost of query QA is compared to the query cost of QA'', the transformed query that reflects the effects of both subquery unnesting and join predicate push down.

Group-by Placement/Join Predicate Push Down

Group-by placement may be interleaved with join predicate push down. A group-by placement is a type transformation that places a group by operator into an inline view, thereby causing an early evaluation of the group-by operation. This transformation may be interleaved with join predicate push down. The following query QP is used to illustrate interleaving based on these transformations.

QP=SELECT T3.C, SUM (T2.y)
    FROM T1, T2, T3
    WHERE T1.x=T2.z and T2.k>4 and T2.d=T3.d
    GROUP BY T3.c;

Query QP is transformed by adding inline V and placing a GROUP-BY operator therein to generate query QP'.

QP'=SELECT T3.c, SUM (V.S)
    FROM T3,
        (SELECT SUM (T2.y) as S, T2.d AS D
         FROM T1, T2
         WHERE T1.x=T2.z and T2.k>4
         GROUP BY T2.d) V
    WHERE T3.d=V.D
    GROUP BY T3.c;

Using join predicate push down, Query QP' is transformed by pushing down join predicate T3.d=T2.d into view V, to generate query QP''.

QP''=SELECT T3.c, SUM (V.S)
    FROM T3,
        (SELECT SUM(T2.y) as S
         FROM T1, T2
         WHERE T1.x=T2.z and T2.k>4
             and T3.d=T2.d) V
    GROUP BY T3.c;

Note also that in QP'' the Group-by operator is also removed, though this is not a necessary operation for a join predicate push down. To determine whether to select group-by placement with join predicate push down, the cost of query QP is compared to the query cost of QP'', the transformed query that reflects the effects of both group-by placement and join predicate push down.

Juxtaposing

Performing one type of transformation may foreclose performing another type of transformation. For example, under sequential processing for $Q_{CS}$, $T_A$ or $T_B$ may be applied but not both. By applying to $T_A$ to $Q_{CS}$, $T_B$ is not applied, and its cost effects are never considered.

According to an embodiment, when application of a particular type of transformation, if applied, precludes another type, both are applied to the same query to generate alternative candidate queries. The alternatives are compared to the original query and a decision is made to select one or none of the transformations. Specifically, applying T1 to $Q_{CS}$ generates $Q_1$. T2 cannot be applied to $Q_1$ but can be applied to $Q_{CS}$. $T_2$ is applied $Q_{CS}$ to generate $Q_2$. The query costs for each of $Q_{CS}$, $Q_1$, and $Q_2$ is computed and compared; the one with the lowest cost is selected for further optimization and later for execution.

Juxtaposing is illustrated with reference to query QJ. QJ may be transformed using join predicate push down to generate QJ', or by view merging to generate query QJ".

```
QJ=SELECT e1.employee_name, j.job_title
    e2.employee_name as mgr_name
   FROM employees e1, job_history j,
     employees e2,
       (SELECT DISTINCT dept_id
        FROM departments d, locations l
        WHERE d.loc_id=l.loc_id and
          l.country_id IN ('UK', 'US')) V
   WHERE e1.emp_id=j.emp_id and
     j.start_date>'19910101' and
     e1.mgr_id=e2.emp_id and
     e1.dept_id=V.dept_id;
QJ'=SELECT e1.employee_name, j.job_title
    e2.employee_name as mgr_name
   FROM employees e1, job_history j,
     employees e2,
       (SELECT dept_id
        FROM departments d, locations l
        WHERE d.loc_id=l.loc_id and
          l.country_id IN ('UK', 'US') and
          e1.dept_id=d.dept_id) V
   WHERE e1.emp_id=j.emp_id and
     j.start_date>'19910101' and
     e1.mgr_id=e2.emp_id;
QJ"=SELECT DV.employee_name, DV.job_title,
    DV.mgr_name
   FROM
     (SELECT DISTINCT e1.emp_id, e2.emp_id,
      j.rowid,
      e1.employee_name, j.job_title,
      e2.employee_name as mgr_name
     FROM employees e1, job_history j,
      employees e2, departments d,
      locations l
     WHERE d.loc_id=l.loc_id and
      l.country_id IN ('UK', 'US') and
      e1.dept_id=d.dept_id and
      e1.emp_id=j.emp_id and
      j.start_date>'19910101' and
      e1.mgr_id=e2.emp_id) DV;
```

Performing join predicate push down forecloses performing view merging, and vice versa. Under juxtaposing, the costs of query QJ, QJ', and QJ" are compared and the one with the cheapest cost is selected for further optimization.

Finally, juxtaposing may be combined with interleaving. For example, $T_1$ is applied to $Q_{CS}$ to generate $Q_1$. $T_2$ and $T_3$ can be applied to $Q_1$ to generate either $Q_2$ or $Q_3$. However, applying $T_2$ forecloses applying $T_3$, that is, $T_3$ cannot be applied to $Q_2$. The query costs for each of $Q_S$, $Q_1$, and $Q_2$ are computed and compared; the one with the lowest cost is selected for optimization.

In the foregoing specification, embodiments of the invention have been described within the context of certain kinds of transformations. However, an embodiment of the present invention is not limited to any particular kind or type of transformation. Further, an embodiment of the present invention is limited to approaches that evaluate transformations using a form of the sequential approach.

Hardware Overview

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of transforming a certain query, comprising:
   making a determination of whether or not to rewrite the certain query using a first transformation, wherein the determination includes:
   applying the first transformation to the certain query to generate a first query;
   generating a second query based on the first query by applying a second transformation;
   determining a query execution cost of the second query; and
   making the determination based on the query execution cost of the second query;
   wherein query execution costs are determined for two or more semantically equivalent queries, the two or more semantically equivalent queries including at least the certain query and the second query; wherein a candidate execution plan is generated for each semantically equivalent query of the two or more semantically equivalent queries; and wherein the candidate execution plan for each semantically equivalent query of the two or more semantically equivalent queries is different than the candidate execution plan for each other semantically equivalent query of the two or more semantically equivalent queries;
   wherein the steps of applying, generating, determining, and making the determination are performed by one or more computing devices.

2. The method of claim 1, wherein the first transformation includes subquery unnesting.

3. The method of claim 2, wherein the second transformation includes join-predicate push down.

4. The method of claim 1, wherein the first transformation includes group-by placement and the second transformation includes join predicate push down.

5. The method of claim 1, wherein the determination is also based on a query execution cost of the certain query.

6. The method of claim 1, wherein the certain query does not qualify for the second transformation's type of transformation.

7. The method of claim 1, wherein the step of generating a second query includes:
   applying another transformation to the certain query to generate another query; and
   applying the second transformation to the another query to generate the second query.

8. A method of transforming a certain query, comprising:
   making a determination of whether or not to rewrite the certain query using a first transformation, wherein the determination includes:
   applying the first transformation to said certain query to generate a first query;

applying a second transformation to the certain query to generate a second query;
generating a first query execution cost for the first query;
generating a second query execution cost for the second query; and
wherein the determination is based on the first query execution cost and the second query execution cost;
wherein query execution costs are determined for two or more semantically equivalent queries, the two or more semantically equivalent queries including at least the first query and the second query; wherein a candidate execution plan is generated for each semantically equivalent query of the two or more semantically equivalent queries; and wherein the candidate execution plan for each semantically equivalent query of the two or more semantically equivalent queries is different than the candidate execution plan for each other semantically equivalent query of the two or more semantically equivalent queries;
wherein the steps of applying, generating, and making the determination are performed by one or more computing devices.

9. The method of claim 8, wherein:
the first query is not qualified for the second transformation's type of transformation; and
the second query is not qualified for the first transformation's type of transformation.

10. The method of claim 8, wherein:
the first transformation includes a view merging; and
the second transformation includes a join predicate push down.

11. A volatile or non-volatile computer-readable medium storing one or more sequences of instructions which, when executed by one or more processors, causes the one or more processors to perform:
making a determination of whether or not to rewrite a certain query using a first transformation, wherein the determination includes:
applying the first transformation to the certain query to generate a first query;
generating a second query based on the first query by applying a second transformation;
determining a query execution cost of the second query; and
making the determination based on the query execution cost the second query;
wherein query execution costs are determined for two or more semantically equivalent queries, the two or more semantically equivalent queries including at least the certain query and the second query; wherein a candidate execution plan is generated for each semantically equivalent query of the two or more semantically equivalent queries; and wherein the candidate execution plan for each semantically equivalent query of the two or more semantically equivalent queries is different than the candidate execution plan for each other semantically equivalent query of the two or more semantically equivalent queries.

12. The computer-readable medium of claim 11, wherein the first transformation includes subquery unnesting.

13. The computer-readable medium of claim 12, wherein the second transformation includes join-predicate push down.

14. The computer-readable medium of claim 11, wherein the first transformation includes group-by placement and the second transformation includes join predicate push down.

15. The computer-readable medium of claim 11, wherein the determination is also based on a query execution cost of the certain query.

16. The computer-readable medium of claim 11, wherein the certain query does not qualify for the second transformation's type of transformation.

17. The computer-readable medium of claim 11, wherein the step of generating a second query includes:
applying another transformation to the certain query to generate another query; and
applying the second transformation to the another query to generate the second query.

18. A volatile or non-volatile computer-readable medium storing one or more sequences of instructions which, when executed by one or more processors, causes the one or more processors to perform:
making a determination of whether or not to rewrite a certain query using a first transformation, wherein the determination includes:
applying the first transformation to said certain query to generate a first query;
applying a second transformation to the certain query to generate a second query;
generating a first query execution cost for the first query;
generating a second query execution cost for the second query; and
wherein the determination is based on the first query execution cost and the second query execution cost;
wherein query execution costs are determined for two or more semantically equivalent queries, the two or more semantically equivalent queries including at least the first query and the second query; wherein a candidate execution plan is generated for each semantically equivalent query of the two or more semantically equivalent queries; and wherein the candidate execution plan for each semantically equivalent query of the two or more semantically equivalent queries is different than the candidate execution plan for each other semantically equivalent query of the two or more semantically equivalent queries.

19. The computer-readable medium of claim 18, wherein:
the first query is not qualified for the second transformation's type of transformation; and
the second query is not qualified for the first transformation's type of transformation.

20. The computer-readable medium of claim 18, wherein:
the first transformation includes a view merging; and
the second transformation includes a join predicate push down.

21. The method of claim 1, wherein the determination is based on a comparison of a query execution cost of the certain query with the query execution cost of the second query.

22. The method of claim 1, wherein the first transformation is an unnesting transformation, and wherein the determination further includes:
determining that the first query comprises a mergeable view;
wherein the second transformation is a view merge transformation; and
wherein the certain query, the first query, and the second query are semantically equivalent queries.

23. The method of claim 1, wherein applying the first transformation to the certain query comprises applying the first transformation to one of multiple subqueries of the certain query; wherein each semantically equivalent query is generated based on a different combination of the subqueries, unnesting operations, and view merge transformations than each other semantically equivalent query; and wherein the determination is also based on the other costs.

24. The method of claim 1, wherein the determination further includes:
applying a third transformation to the certain query to generate a third query;
generating a fourth query based on the third query by applying a fourth transformation; and
determining a query execution cost of the fourth query;
wherein the determination is also based on the query execution cost of the fourth query.

25. The method of claim 24, wherein the determination is based on a comparison of the query execution cost of the second query with the query execution cost of the fourth query.

26. The method of claim 24, wherein applying the first transformation to the certain query comprises applying the first transformation to a first subquery of the certain query, and wherein applying the third transformation to the certain query comprises applying the third transformation to a second subquery of the certain query.

27. The method of claim 26, wherein the first transformation and the third transformation are unnesting transformations, and wherein the second transformation and the fourth transformation are view merge transformations.

28. The computer-readable medium of claim 11, wherein the determination is based on a comparison of a query execution cost of the certain query with the query execution cost of the second query.

29. The computer-readable medium of claim 11, wherein the first transformation is an unnesting transformation, and wherein the determination further includes:
determining that the first query comprises a mergeable view;
wherein the second transformation is a view merge transformation; and
wherein the certain query, the first query, and the second query are semantically equivalent queries.

30. The computer-readable medium of claim 11, wherein applying the first transformation to the certain query comprises applying the first transformation to one of multiple subqueries of the certain query; wherein each semantically equivalent query is generated based on a different combination of the subqueries, unnesting operations, and view merge transformations than each other semantically equivalent query; and wherein the determination is also based on the other costs.

31. The computer-readable medium of claim 11, wherein the determination further includes:
applying a third transformation to the certain query to generate a third query;
generating a fourth query based on the third query by applying a fourth transformation; and
determining a query execution cost of the fourth query;
wherein the determination is also based on the query execution cost of the fourth query.

32. The computer-readable medium of claim 31, wherein the determination is based on a comparison of the query execution cost of the second query with the query execution cost of the fourth query.

33. The computer-readable medium of claim 31, wherein applying the first transformation to the certain query comprises applying the first transformation to a first subquery of the certain query, and wherein applying the third transformation to the certain query comprises applying the third transformation to a second subquery of the certain query.

34. The computer-readable medium claim 33, wherein the first transformation and the third transformation are unnesting transformations, and wherein the second transformation and the fourth transformation are view merge transformations.

35. The method of claim 8, wherein the determination is based on a comparison of the first query execution cost with the second query execution cost.

36. The method of claim 8, wherein applying the first transformation to said certain query comprises applying the first transformation to a first subquery of said certain query, and wherein applying the second transformation to the certain query comprises applying the second transformation to a second subquery of said certain query.

37. The computer-readable medium of claim 18, wherein the determination is based on a comparison of the first query execution cost with the second query execution cost.

38. The computer-readable medium of claim 18, wherein applying the first transformation to said certain query comprises applying the first transformation to a first subquery of said certain query, and wherein applying the second transformation to the certain query comprises applying the second transformation to a second subquery of said certain query.

* * * * *

UNITED STATES PATENT AND TRADEMARK OFFICE
CERTIFICATE OF CORRECTION

| | | |
|---|---|---|
| PATENT NO. | : 7,702,627 B2 | |
| APPLICATION NO. | : 11/716126 | |
| DATED | : April 20, 2010 | |
| INVENTOR(S) | : Rafi Ahmed et al. | |

It is certified that error appears in the above-identified patent and that said Letters Patent is hereby corrected as shown below:

In column 10, line 63, in claim 8, delete "the" and insert -- a --, therefor.

In column 11, line 26, in claim 9, after "for" delete "the".

In column 12, line 44, in claim 19, after "for" delete "the".

Signed and Sealed this
Twelfth Day of April, 2011

David J. Kappos
*Director of the United States Patent and Trademark Office*